US011617439B2

(12) United States Patent
Aulbach et al.

(10) Patent No.: US 11,617,439 B2
(45) Date of Patent: Apr. 4, 2023

(54) SHELF FOR A CLIMATE CABINET AND SET AND CLIMATE CABINET COMPRISING SAID SHELF

(71) Applicant: Thermo Electron LED GmbH, Langenselbold (DE)

(72) Inventors: Holger Aulbach, Langenselbold (DE); Christopher Kabus, Langenselbold (DE); Patrick Fanta, Langenselbold (DE); Rainer Schuck, Langenselbold (DE)

(73) Assignee: Thermo Electron LED GmbH, Langenselbold (DE)

( * ) Notice: Subject to any disclaimer, the term of this patent is extended or adjusted under 35 U.S.C. 154(b) by 143 days.

(21) Appl. No.: 17/142,331

(22) Filed: Jan. 6, 2021

(65) Prior Publication Data

US 2021/0259412 A1     Aug. 26, 2021

(30) Foreign Application Priority Data

Feb. 21, 2020  (DE) .......................... 102020001162.4

(51) Int. Cl.
| *A47B 81/00* | (2006.01) |
| *A47B 96/06* | (2006.01) |
| *F16B 1/00* | (2006.01) |
| *F25D 13/00* | (2006.01) |

(52) U.S. Cl.
CPC .............. *A47B 81/00* (2013.01); *A47B 96/06* (2013.01); *F16B 1/00* (2013.01); *F25D 13/00* (2013.01); *F16B 2001/0035* (2013.01)

(58) Field of Classification Search
CPC ....... A47B 81/00; A47B 96/06; A47B 96/021; A47B 96/02; A47B 96/14; F16B 1/00; F16B 2001/0035; F25D 13/00
USPC ................. 312/209, 408, 351; 108/106–108; 211/153, 135; 248/247
See application file for complete search history.

(56) References Cited

U.S. PATENT DOCUMENTS

| 3,511,193 A * | 5/1970 | Schild .................. A47B 57/045 248/250 |
| 3,556,306 A | 1/1971 | Shell |
| 9,635,958 B2 * | 5/2017 | Neelagantan ......... A47F 5/0043 |
| 10,123,617 B2 * | 11/2018 | Rollins ................ A47B 96/021 |
| 10,202,574 B2 * | 2/2019 | Eberle .................... C12M 41/14 |

(Continued)

FOREIGN PATENT DOCUMENTS

| CN | 1213954 A | 4/1999 |
| CN | 102365517 A | 2/2012 |

(Continued)

OTHER PUBLICATIONS

English trasnlation for DE4227828 (Year: 1993).*
European Patent Office, European Search Report, Application No. EP20210589, dated May 25, 2021 (2 pages).

*Primary Examiner* — Janet M Wilkens
(74) *Attorney, Agent, or Firm* — Wood Herron & Evans LLP (57) ABSTRACT

A shelf is provided which has a placement surface for objects to be treated in the climate cabinet and an underside opposite the placement surface, wherein the shelf can be mounted in a climate chamber of the climate cabinet. At least one reinforcing rib is detachably fastened to a base plate of the shelf.

9 Claims, 4 Drawing Sheets

(56) References Cited

U.S. PATENT DOCUMENTS

| | | | | |
|---|---|---|---|---|
| 2003/0041572 A1* | 3/2003 | Lohr | ............... | B01D 53/02 |
| | | | | 55/385.2 |
| 2005/0244306 A1* | 11/2005 | Stahl | ............... | C12M 37/00 |
| | | | | 422/400 |
| 2011/0042336 A1* | 2/2011 | Cheng | ............... | A47B 96/02 |
| | | | | 211/153 |
| 2012/0024006 A1 | 2/2012 | Knoll et al. | | |
| 2015/0090683 A1* | 4/2015 | Sabounjian | ............ | A47B 96/14 |
| | | | | 211/186 |
| 2016/0367047 A1 | 12/2016 | Neelagantan et al. | | |
| 2017/0335868 A1* | 11/2017 | Coronado | ............... | B01L 9/52 |

FOREIGN PATENT DOCUMENTS

| | | | |
|---|---|---|---|
| CN | 206600977 U | | 10/2017 |
| CN | 206600980 U | | 10/2017 |
| CN | 206891016 U | | 1/2018 |
| DE | 4227828 | * | 2/1993 |
| EP | 2412276 | * | 2/2012 |
| FR | 2673086 | * | 8/1992 |
| JP | 627112 | * | 2/1987 |
| JP | H09145244 A | | 6/1997 |
| JP | H11118347 A | | 4/1999 |
| JP | 3354041 B2 | | 12/2002 |
| KR | 1020070109517 A | | 11/2007 |
| WO | 9726808 A1 | | 7/1997 |

\* cited by examiner

SHELF FOR A CLIMATE CABINET AND SET AND CLIMATE CABINET COMPRISING SAID SHELF

CROSS-REFERENCE TO RELATED APPLICATION

The present application claims priority under 35 U.S.C. § 119 of German Patent Application No. 10 2020 001 162.4, filed Feb. 21, 2020, the disclosure of which is hereby incorporated herein by reference in its entirety.

FIELD OF THE INVENTION

The present invention relates to a shelf for a climate cabinet and a climate cabinet comprising at least one shelf.

BACKGROUND OF THE INVENTION

In the context of the present invention, a climate cabinet is to be understood as a storage or processing cabinet as it is used in particular in laboratories to treat devices, sample containers or the like at a certain temperature or in a certain temperature range, i.e., to store and/or process them. Examples of such climate cabinets are drying cabinets/laboratory ovens, autoclaves and incubators, including gas incubators, refrigerators and freezers, in particular laboratory refrigerators and laboratory freezers. In many of these devices, biological or microbiological samples are stored in a climate chamber of the climate cabinet, for example in an incubator at a predetermined temperature, for example 37° C., and simultaneously incubated at a controlled humidity and, in the case of fumigation incubators, a controlled gas atmosphere.

The climate chamber is equipped with at least one shelf for storing the devices and/or sample containers. The shelf has a flat base plate comprising a placement surface on which the objects to be stored or processed in the climate chamber are placed. In order to achieve a uniform temperature distribution within the climate chamber, the base plate is often provided with through-openings and has, for example, either the shape of a perforated plate or a grid. Generally, the shelf is made of metal, such as stainless steel, chrome-plated steel or copper. Its size corresponds approximately to the inner cross section of the climate chamber in the horizontal direction and is usually mounted in its edge region on rear wall mounts and/or lateral mounts which are attached to opposite side walls inside the climate chamber. The shelf can usually be removed from the climate chamber through a front opening of the climate cabinet that can be closed by a door, for example in order to be cleaned.

Figure 9:
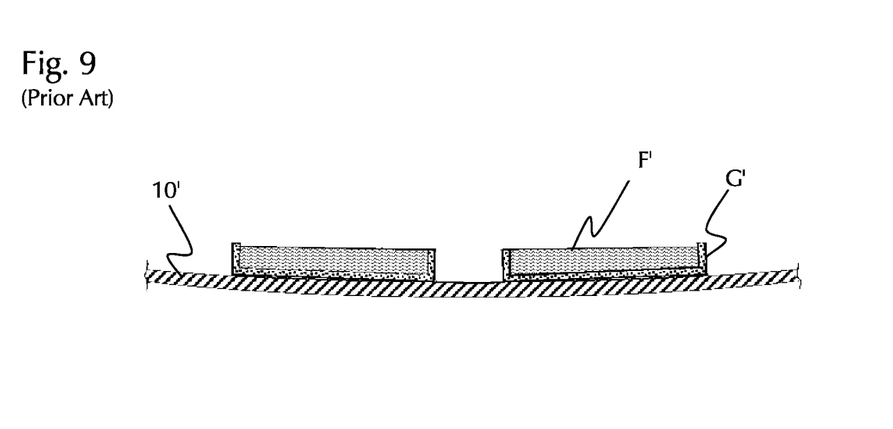
FIG. 9 shows a shelf from the prior art having microtiter plates arranged thereon in partial sectional view.

If biological or microbiological samples are stored in the climate chamber, not only the climate chamber itself but also the shelf must be disinfected at regular intervals in order to render adherent germs harmless. Regions that are difficult to access make thorough disinfection more difficult. In the case of a conventional shelf, poorly accessible regions like this exist where the shelf is provided with a reinforcing means in order to increase the load-bearing capacity of the shelf. A problem with the load-bearing capacity of the shelf occurs above all in the case of a large-area base plate—as illustrated in FIG. 9. If the base plate 10' is loaded with many and/or heavy objects G', it bends downward in its central region. This means that the objects in this region no longer stand straight. If the objects are sample vessels such as petri dishes or microtiter plates, the inclination means that the filling level in the vessel is not uniform, and therefore the conditions for the samples are not exactly identical over the surface of the sample vessel. In extreme cases with very large sample vessels with a low filling level, a partial region of the sample vessel is no longer covered with sample medium. The uneven filling level can lead to a falsification of the results. The inclination can also lead to sample liquid F' running over the edge of the sample vessel when the filling level is high. This not only leads to a loss of sample, but also to contamination of the climate chamber and possibly to contamination of other samples, with the result that all samples contained in the climate chamber have to be discarded. To prevent this, it is known to manufacture shelves for climate cabinets from a thicker material. This makes it possible for the bending of the base plate to be reduced somewhat, but at the expense of its own weight, reduced load capacity in the climate device and higher production costs.

Figure 10:
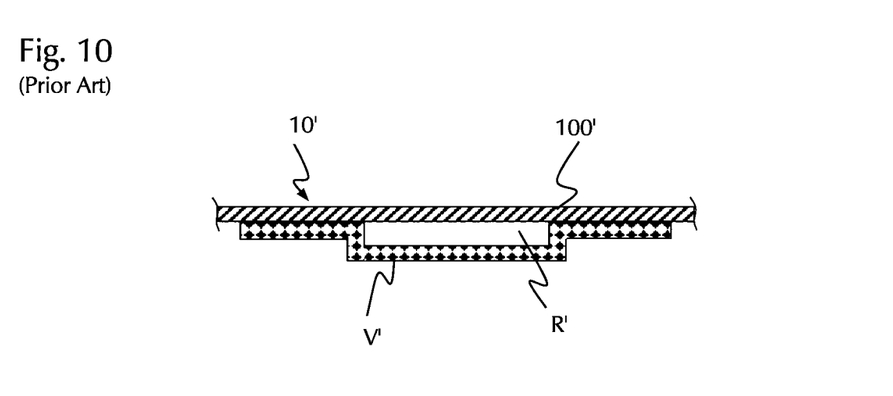
FIG. 10 shows a partial sectional view of a shelf from the prior art having a reinforcing element.

Another possibility, shown in FIG. 10, provides shelves in which at least one reinforcing element V' is undetachably fastened, for example welded, to the underside 101' of the base plate opposite the placement surface 100' of the base plate 10'. For example, strip-shaped reinforcing elements or reinforcing elements in the form of a honeycomb structure are known. Although these are somewhat lighter in weight than shelves which are thicker overall, they have the disadvantage of being very complex and expensive to manufacture. In addition, the shelves provided with the reinforcing elements are difficult to clean and disinfect in the contact regions of the shelf and the reinforcing element and in the poorly accessible space R' between the reinforcing element and the base plate. This entails the risk of inadvertent contamination of the climate chamber and the objects stored therein.

SUMMARY OF THE INVENTION

One aspect of the present invention is to provide a shelf for a climate cabinet that does not have the above disadvantages, and in particular to provide a high load-bearing capacity with at most slight bending of the base plate while at the same time making it easy to clean and disinfect well.

In its first aspect, the present invention therefore relates in detail to a shelf for a climate cabinet, which shelf has a base surface comprising a placement surface for objects to be treated in the climate chamber and an underside opposite the placement surface. The shelf can be mounted in a climate chamber of the climate cabinet in a conventional manner, for example at an outer edge region. A climate cabinet, as defined at the outset, is to be understood as a storage or processing cabinet as it is used in particular in laboratories to treat devices, sample containers or the like (hereinafter generally referred to as "objects") at a certain temperature or in a certain temperature range, i.e., to store and/or process them. Examples of such climate cabinets are drying cabinets/laboratory ovens, autoclaves and incubators, including gas incubators, refrigerators and freezers, in particular those for laboratories.

According to one embodiment of the present invention, at least one reinforcing rib is detachably fastened to the base plate. The detachable fastening of the at least one reinforcing rib allows it to be removed from the shelf in a simple manner and to be cleaned and disinfected separately from it. This makes both processes much easier, since both the shelf without reinforcing elements and the reinforcing rib are much more accessible for cleaning and disinfection than the reinforced shelves from the prior art. Concealed points that are difficult to access or cannot be reached at all for a disinfection process can be avoided according to the present invention.

In the context of the present invention, a detachable fastening is to be understood as a fastening of the reinforcing rib(s) and shelf to one another that does not require fastening means such as screws which are separate from the two components. Permanent connections such as welded or soldered connections, of course, do not fall under a detachable fastening within the meaning of the present invention. The shelf and reinforcing rib(s) should be able to be separated from one another without using tools if possible. Of course, this does not preclude the use of a tool, such as a screwdriver, to make it easier to detach the two components from one another. The tool is then not used to remove or loosen separate fastening means, but only to separate the reinforcing rib(s) from the shelf. The at least one reinforcing rib is preferably detachably fastened to the shelf by means of at least one latching, plug or clamping connection. Combinations of different types of connection in one and the same fastening element or the use of different types of fastening elements next to one another are also possible. It is basically irrelevant whether, for example, there is a latching projection on the reinforcing rib or on the shelf. It is possible, for example, to provide a plurality of latching projections on the reinforcing rib and complementary latching indentations or latching openings on the shelf. However, the reverse variant or the provision of both latching projections and latching indentations/openings on the two components is also conceivable. In an analogous manner, plug projections can be provided on the reinforcing rib and/or the shelf, which projections engage in matching openings or indentations on the counterpart and thus detachably fasten the reinforcing rib to the shelf. Clamping connections can, for example, make use of at least one resilient tab or a similar spring element on one of the components that clamps the other of the components under tension. In a possible variant, a resilient tab projecting over the base plate of the shelf can press the reinforcing rib against a stop, or alternatively two spring tabs can clamp a reinforcing rib between them. In a further variant, the at least one reinforcing rib and the shelf are magnetically fastened to one another. For this purpose, one of the two components expediently contains at least one permanent magnet in order to be able to establish a magnetic connection to at least one metal counterpart arranged on the other component or to the other component which consists entirely of a suitable metal. In each case, the at least one reinforcing rib is basically detachably fastened only to the shelf and not additionally to any other components which are separate from the shelf. The at least one reinforcing rib therefore has, in particular exclusively, fastening means for being detachably fastened to the shelf. Specifically, the at least one reinforcing rib in particular has no fastening means for fastening it to the walls surrounding the climate chamber or to mounting means of the climate chamber such as slide-in rails or other supports with which the shelf can be mounted in the climate chamber. The at least one reinforcing rib is expressly not used to mount the shelf in the climate chamber. Rather, after it has been detachably fastened to the shelf, it can be introduced into and removed from the climate chamber together with the shelf, to which said reinforcing rib is fastened.

Apart from changes that allow the at least one reinforcing rib to be detachably fastened to it, the shelf can otherwise basically be designed as in the prior art. In particular, it can have the same mounting apparatuses as the known shelves, and therefore it is readily compatible with the mounting systems of the climate cabinets in the prior art. For example, sliding rails in the region of the side walls of the climate chamber, on which the shelf rests at opposite edge region portions, are common. The shelf is preferably made of metal, for example copper or steel, in particular stainless steel, although other materials such as temperature-stable plastics are not fundamentally excluded. In order to achieve a uniform temperature distribution within the climate chamber, the base plate of the shelf usually has a plurality of openings or is designed as a grid. The same main structure of the shelf according to one embodiment of the present invention also allows the shelves from the prior art to be retrofitted by subsequently installing suitable fastening means for receiving at least one reinforcing rib to be detachably fastened. If it is not possible or undesirable to convert an existing shelf, climate cabinets from the prior art can also be retrofitted with a shelf, to which at least one reinforcing rib can be detachably fastened. The shelf can be offered separately for later retrofitting to at least one matching reinforcing rib or in combination with at least one reinforcing rib which can be detachably fastened to said shelf. The present invention accordingly also relates to a set consisting of a shelf and one and preferably more reinforcing ribs to be detachably fastened to said shelf and also a climate cabinet which has at least one shelf according to one embodiment of the present invention.

The shape of the at least one reinforcing rib is fundamentally not further restricted as long as it can exercise its function of preventing the base plate from bending, optionally in combination with at least one further reinforcing rib. In one variant, it is designed to be substantially rod-shaped, preferably as a hollow rod and in particular as a hollow-edged rod. In an alternative variant, the reinforcing rib is formed by a profile and is designed in particular as an L-profile or U-shaped profile, of which the free ends preferably face toward the base plate. This results in an outwardly closed appearance while simultaneously having high stability and low weight. The material from which the at least one reinforcing rib is made is not particularly limited as long as it has sufficient flexural rigidity and temperature resistance for the intended application. For example, reference can be made to suitable plastics materials and, above all, to metal, for example copper or steel, in particular stainless steel. The production takes place in a basically known manner, preferably from a metal sheet by punching, laser cutting or the like, the later fastening means expediently being formed at the same time and being in particular in the outer edge regions. The shape and dimensions of the reinforcing rib are primarily based on the shelf with which the reinforcing rib is to be used, with the desired load-bearing capacity of the base plate also having to be taken into account. The length of the reinforcing rib is expediently large enough to sufficiently prevent the base plate of the shelf from bending. A reinforcing rib therefore expediently runs between opposite edge region portions of the shelf such that the base plate is stabilized by the reinforcing rib over its entire width. The opposite edge region portions can be those that are oriented toward the front opening and the rear wall of the climate chamber when a shelf is inserted into the climate chamber of a climate cabinet, or those on which the shelf is mounted in the region of the lateral walls of the climate chamber.

The number of reinforcing ribs used depends primarily on the size of the shelf. The larger the area of the base plate, the more reinforcing ribs should be used to reliably prevent the base plate from bending under the weight of the objects to be stored in the climate chamber. The number and weight of the objects also have an influence on the number of reinforcing ribs required. The shelf is expediently designed in such a way that the number of reinforcing ribs can be selected by the user in a variable manner and, for example, depending on the expected load of the base plate. In addition, the user can choose where a reinforcing rib is fastened. In this way, for example, it is also possible to adapt to locally different loads on the base plate, for example by selecting a greater number of reinforcing ribs in the region of the higher load than in a region with a smaller load. Accordingly, a plurality of fastening means is provided on the shelf, to which a plurality of reinforcing ribs can be, but do not have to be, detachably fastened. The number of fastening options, to which a reinforcing rib can be fastened and which are provided by the fastening means, can therefore be greater than the number of actually fastened reinforcing ribs. In some embodiments, the shelf can therefore also have fastening means to which no reinforcing rib is fastened. For example, 2 to 8, preferably 2 to 6, and in particular 3 to 5, pairs of fastening means can be present such that, depending on the requirements, between 2 and 8 (or 2 to 6 or 3 to 5) reinforcing ribs can be used. The reinforcing ribs preferably extend substantially in parallel with one another, their longitudinal axes expediently not deviating from one another by more than ±2°. The reinforcing ribs can also be designed in such a way that they can intersect one another (for example by providing notches along the reinforcing ribs at which two reinforcing ribs can be plugged to one another so as to intersect), or a plurality of reinforcing ribs can be designed as a grid from the start, which grid can be detachably fastened to the shelf as a whole.

In order to be able to detachably fasten a reinforcing rib to the shelf, said rib expediently has fastening means which are complementary to the fastening means provided on the shelf. The various options for latching, plugging, clamping or magnetic connections have already been stated above. On the shelf, the fastening means are preferably located in or on its outer edge region. In many cases, shelves are made from a metal sheet which is bent over in the region of the outer edges of the base plate in order to produce an edge region. Said edge region protrudes, for example, perpendicularly from the top and/or bottom of the base plate opposite the footprint. The region which adjoins one of the lateral edges of the base plate is referred to as the edge region portion. For a usually rectangular base plate, there are thus a total of four edge region portions which make up the edge region of the shelf. The edge region portions can either all be arranged on the same side of the base plate or extend away from the base plate on different sides. Optionally, the free end regions of each of the edge region portions are folded again, for example folded inward under the underside of the base plate.

According to one embodiment of the present invention, the fastening means of the shelf may be provided as far as possible on the edge of the base plate and in particular in or on the edge region of the shelf. For this purpose, material from the base plate and/or the edge region can advantageously be used to form the fastening means, for example a tab protruding over the base plate or a latching projection. Alternatively, at least one indentation or recess can be provided in the edge region, in which recess or depression a complementary plug or latching projection of a reinforcing rib can engage. The arrangement of the fastening means in or on the edge region also has the advantage that little or no space on the placement surface is used by the fastening means. For this reason, the fastening means may be arranged in such a way that the at least one reinforcing rib comes to lie on the underside of the base plate. The fastening means required for fastening the reinforcing rib are expediently located in the region of their opposite ends, which means that the reinforcing rib extends over substantially the whole width of the base plate practically over its entire length when the complementary fastening means are in the edge region of the shelf. Bending is particularly effectively prevented in this way. In one embodiment, the reinforcing rib abuts a portion of the base plate with at least 80%, preferably at least 90%, in particular at least 95%, of its length, which portion makes up at least 80%, preferably at least 90% and in particular at least 95%, of the width of the base plate.

In a further development of the present invention, the at least one reinforcing rib has a height profile in its direction of longitudinal extension on its side facing the base plate. The height profile is expediently designed such that the height of the reinforcing rib is greatest in a central region and may decrease continuously toward the sides. If the reinforcing rib is fastened to the shelf in such a way that the side provided with the height profile abuts the underside of the base plate, the base plate is arched upward in a central region toward the placement surface side. The placement surface is thus almost pretensioned in its particularly easily deformable central region. If objects are placed on the placement surface in this region, the base plate bends downward under its mass. If the height profile is correctly designed depending on the weight load to be expected on the base plate, the pretensioning ensures that the base plate forms a flat surface in the loaded state and that the objects on it thus stand straight. This configuration is particularly suitable if relatively heavy objects are to be stored on the base plate.

In a further development of the variant described above, the reinforcing rib can have different height profiles on different sides which are designed for different weight loads. In one variant, for example, a height profile is present on one side of the reinforcing rib, while the opposite side is flat. In all of the cases described, the reinforcing rib is designed so that it can be detachably fastened to the shelf in different orientations. Depending on the intended load of the shelf, the reinforcing rib is rotated such that the desired height profile faces toward the base plate, and is fastened to the shelf in this orientation.

BRIEF DESCRIPTION OF THE DRAWINGS

The present invention will be explained in more detail below with reference to drawings. The drawings are merely illustrative of preferred embodiments of the present invention, without the present invention being limited to these examples. The figures in the drawings are purely schematic. Identical parts are denoted by the same reference symbols, although not all parts are provided with reference symbols in all figures. In the drawings, in detail:

FIG. 3 (*a*) shows a perspective detail view of one end of a reinforcing rib;

FIG. 3 (*b*) shows a fastening tab matching the reinforcing rib according to FIG. 3 (*a*) in plan view;

FIG. 4 (*a*) shows a perspective detailed view of one end of a further reinforcing rib;

FIG. 4 (*b*) shows a fastening tab matching the reinforcing rib according to FIG. 4 (*a*) in plan view;

FIG. 4 (c) shows a further fastening tab matching the reinforcing rib according to FIG. 4 (a) in plan view;

DETAILED DESCRIPTION OF THE INVENTION

Figure 1:
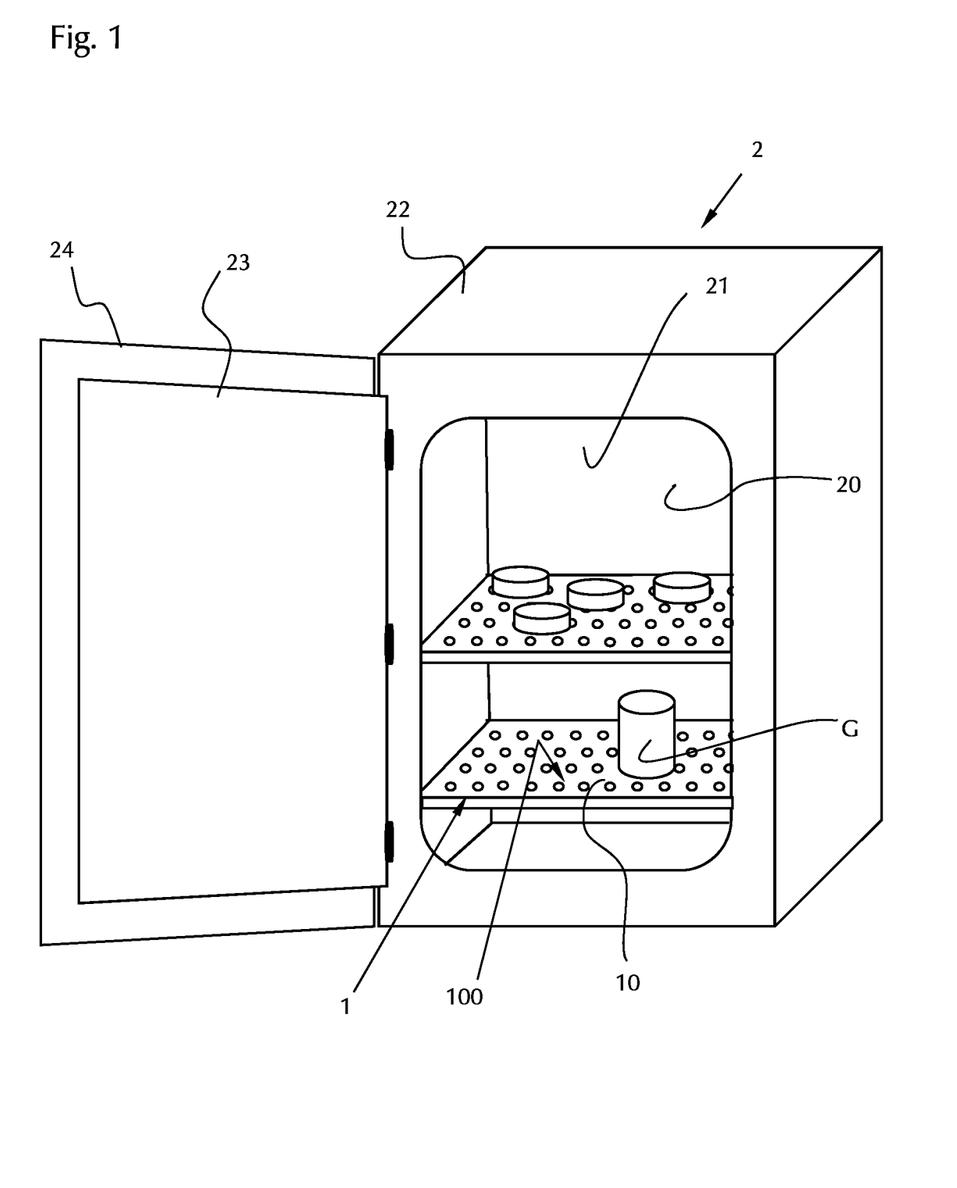
FIG. 1 shows a climate cabinet according to the present invention in perspective view.

FIG. 1 shows a climate cabinet 2 according to one embodiment of the present invention, for example an incubator. The climate cabinet has a climate chamber 20 which is accessible via a front-side opening 21 and is enclosed on the other sides by a housing 22. The opening 21 can be closed by an inner door 23, which usually consists of glass, and an outer door 24. The structure of the climate chamber basically corresponds to the climate chambers from the prior art, and therefore it does not have to be described further here. On the lateral walls surrounding the climate chamber 20, mounts (not shown here) are also provided in a manner which is also basically known and can carry a plurality of shelves 1. The shelves have a base plate 10, on the placement surface 100 of which objects G (laboratory equipment such as in particular petri dishes or microtiter plates are shown in this case) can be stored under predetermined temperature conditions. In the case of the incubator shown, a desired humidity and, optionally, a predetermined gas atmosphere can also be set in the climate chamber.

Figure 2:
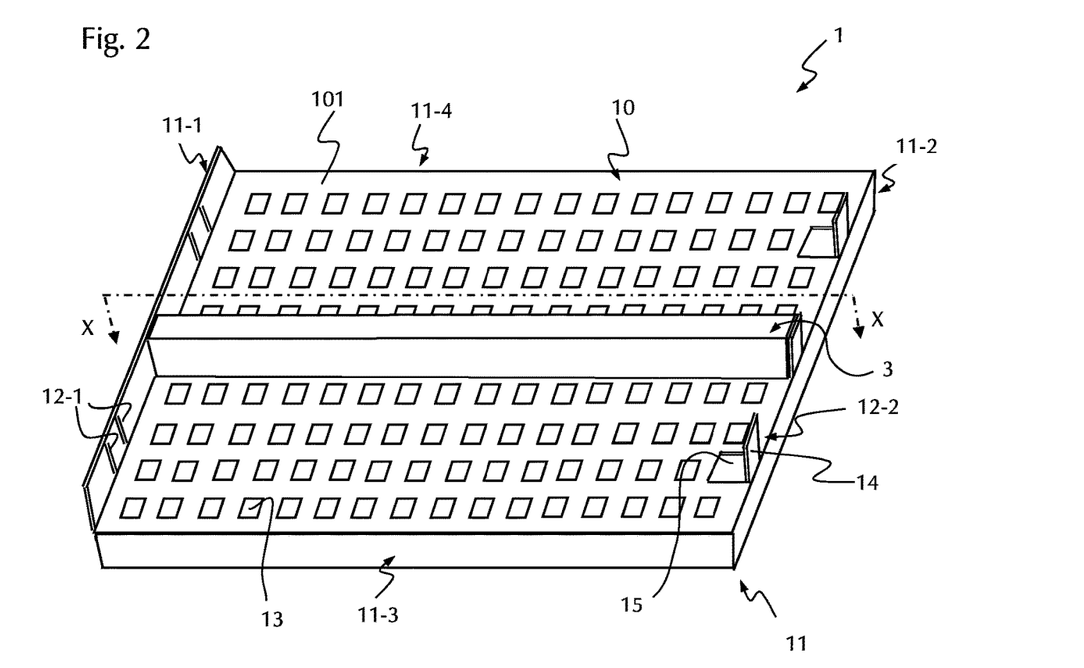
FIG. 2 shows an example of a shelf or set according to the present invention in perspective view with a view of its underside.

For cleaning, the shelves 1 can be removed from the climate chamber 20 through the opening 21. An example of a shelf 1 according to one embodiment of the present invention is shown in FIG. 2. The figure shows the view of the underside 101 of the base plate 10 opposite the placement surface 100. The base plate 10 is provided with a large number of through-openings 13 (here square) which facilitate the setting of a uniform atmosphere in the climate chamber 20. The shelf 1 is made of a metal sheet, for example a stainless steel sheet, which has been folded in its edge region 11 in order to produce edge region portions 11-1, 11-2, 11-3 and 11-4 on the four sides of the base plate 10, which portions are substantially perpendicular to the plane of the base plate 10. The edge portion 11-1 is the portion which is oriented toward the front opening 21 when the base plate 1 is arranged in the climate chamber 20. It is folded toward the underside 101 of the base plate 10, while the remaining edge portions 11-2 to 11-4 project toward the placement surface 100. The separating cuts between the adjacent edge portions, the through-openings 13 and further cuts in the metal sheet may be made in the metal sheet in a common work step, for example by punching or laser cutting.

In the example shown, further cuts are made in the edge region portion 11-1 in order to produce three pairs of slot-shaped recesses extending perpendicularly to the plane of the base plate 10 in the finished base plate, which recesses represent fastening means 12-1 to which a reinforcing rib 3 can be detachably fastened. Corresponding fastening means 12-2, opposite the fastening means 12-1, in the form of substantially rectangular mounting tabs 14 are provided on the opposite edge region 11-2. To produce said tabs, the contour of the mounting tab 14 is cut out of the base plate on three sides starting from the lateral edge of the base plate 10 and the mounting tab 14 is bent out of the base plate 10 such that it protrudes perpendicularly in extension of the edge region portion 11-2 over said base plate and an opening 15 remains in the base plate. A pair of slot-shaped recesses, which correspond to the fastening means 12-1 and extend perpendicularly to the plane of the base plate 10 after the mounting tab 14 has been bent out, was previously made in the surface of the retaining tab, expediently in the same work step as making the further cuts.

Figure 3:
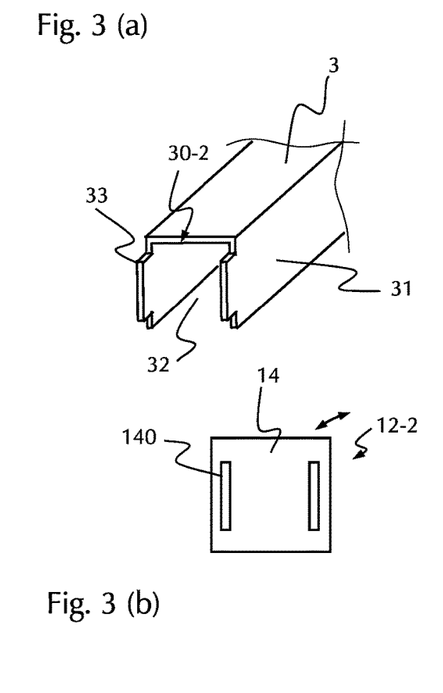

FIGS. 3 (a) and (b) clarify the design of the fastening means 30-2 on the reinforcing rib 3 and the fastening means 12-2. What is described below applies analogously to the opposite pair of fastening means 12-1 and 30-1, since the fastening means 30-1 and 30-2 are formed identically at the two ends of the reinforcing rib 3 and the shelf fastening means 12-1 and 12-2 only differ from one another in that in the former case, the slot-shaped recesses are in the continuous edge region portion 11-1 and not, as in the latter case, on separate mounting tabs. FIG. 3 (a) shows the reinforcing rib 3 from FIG. 2 in the region of one of its ends. As can be seen, the reinforcing rib is designed as a substantially U-shaped profile. The free legs 31 are preferably arranged in such a way that they face toward the base plate 10 when the reinforcing rib 3 is fastened to the shelf. The cavity 32 is then enclosed by the reinforcing rib 3 and the base plate 10. For fastening, the reinforcing rib 3 has, at its ends in the direction of its direction of longitudinal extension, protruding strip-shaped projections 33 on the two legs 31 which form the fastening means 30-1 and, at the opposite end, the fastening means 30-2 of the reinforcing rib. The projections 33 are dimensioned such that they can be plugged into the slot-shaped recesses of the fastening means 12-1 and 12-2 of the shelf. The slot-shaped recesses are only so large that the projections 33 can be received in them and the attached reinforcing rib can only move a little or not at all with respect to the shelf. FIG. 3 (b) shows a shelf fastening means 12-2, in which slot-shaped recesses 140 have been made in a mounting tab 14. As described above, the arrangement of the slot-shaped recesses of the fastening means 12-1 in the edge region portion 11-1 corresponds thereto.

In order to fasten a reinforcing rib 3 to the shelf 1, the end oriented toward the edge region portion 11-1 is first fastened by the projections 33 being inserted into the slot-shaped recesses of a fastening means 12-1. The other end of the reinforcing rib 3 is then moved toward the base plate 10 and the mounting tab 14 opposite the selected fastening means 12-1 until the projections 33 come into contact with the mounting tab 14. When the reinforcing rib 3 is pressed further toward the base plate 10, the projections 33 push the free end of the mounting tab 14 outward, since the mounting tab 14 is resilient, as indicated by the arrow in FIG. 3 (b). The projections 13 slide into the slot-like recesses 140 and the mounting tab 14 springs back into its initial position such that the reinforcing rib 3 is securely mounted on the shelf 1. In order to release the reinforcing rib 3 from its fastening, the mounting tab can be moved slightly outward away from the projections 33 such that the end of the reinforcing rib oriented toward the edge portion 11-2 can be detached from the mounting tab 14. The other end is then removed from the fastening means 12-1.

In the example in FIG. 2, fastening means for fastening up to three reinforcing ribs 3 are provided. The number of reinforcing ribs that are actually used can be decided by the user as desired, taking into account the intended load of the placement surface 100 of the shelf 1. In addition, the user can freely choose at which of the three intended fastening locations the at least one reinforcing rib is fastened. Plainly, the greater the number of reinforcing ribs selected to be used, the less the base plate 10 bends. The arrangement shown in FIG. 2 is not only an example of a shelf 1 according to one embodiment of the present invention, but also of a set according to the present invention comprised of a shelf and at least one reinforcing rib. However, a set will expediently include at least as many reinforcing ribs as there are fastening options on the shelf—in the example shown, at least three reinforcing ribs. These will preferably be three reinforcing ribs of the same type since this simplifies handling for the user. In principle, however, it is also conceivable to put together a set having different types of reinforcing ribs. The reinforcing ribs can, for example, have different flexural strengths such that an even more flexible adaptation to the intended load of the base plate is possible through a suitable selection of the reinforcing ribs.

Figure 4:
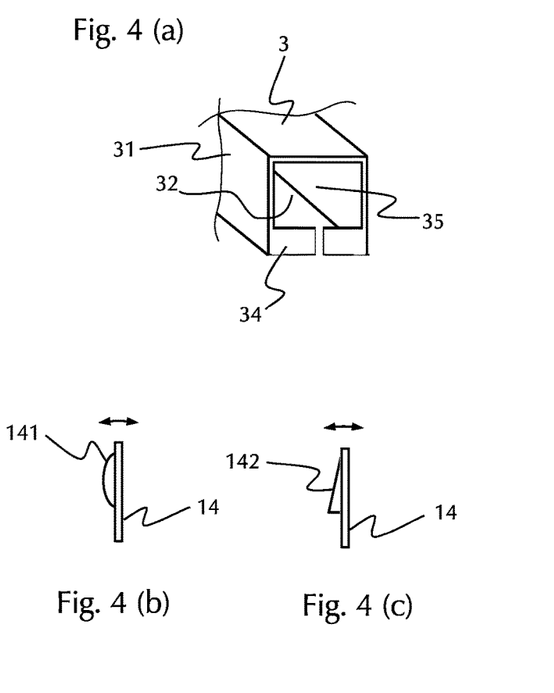

FIG. 4 shows alternative options for detachably fastening the reinforcing rib to the shelf. As in FIG. 3 (*a*), the reinforcing rib 3 shown in FIG. 4 (*a*) is designed as a substantially U-shaped profile which is aligned with the free ends of the legs 31 toward the base plate 10 of the shelf 1. At the two ends of the reinforcing rib 3, at the free ends of the legs 31, a rectangular tab 34 is bent perpendicularly to the plane of the legs in front of the cavity 32. This results in a locking bolt having an overlying window-like opening 35 at the end of the cavity 32. The window-like opening 35 is used to receive a latching projection of the shelf. Examples of suitable latching projections are shown in FIGS. 4 (*b*) and (*c*). Both figures show the latching projections formed on a mounting tab 14. Corresponding latching projections can also be located in the region of the opposite edge portion 11-1. Alternatively, a different type of fastening such as the plug connection shown in FIG. 2 can also be used in the edge region 11-1. In FIG. 4 (*b*), the latching projection is designed as a dome 141 which is shaped out of the plane of the mounting tab 14. In FIG. 4 (*c*), the latching projection is designed as a latching lug 142. When the reinforcing rib 3 is put on, the bent rectangular tabs 34 slide on the mounting tab 14 and the latching projection 141 or 142 and bend the mounting tab 14 outward until the tabs 34 are pushed all the way past the latching projection. The mounting tab then springs back into its initial position, as illustrated by the double arrows, and the reinforcing rib 3 latches in place on the mounting tab 14. In order to detach the reinforcing rib 3 from the shelf 1, the mounting tab 14 can be moved slightly outward such that the tabs 34 can slide past on the latching projection.

Figure 5:
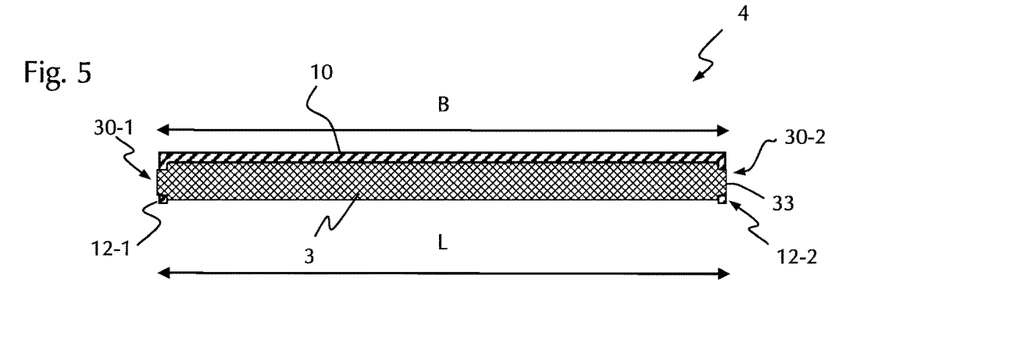
FIG. 5 shows a sectional view along the line X-X in FIG. 2.

FIG. 5 shows a cross section along the line X-X in FIG. 2 in the region through one of the legs 31 and projections 33 of the reinforcing rib 3 located at the ends of said legs. As can be seen, the reinforcing rib 3 extends with its length L over the entire width B of the base plate 10. The free edge of the leg 31 abuts the underside 101 of the base plate 10. The projections 33 are plugged into the slots of the fastening means 12-1 in the edge region portion 11-1 or 12-2 of a mounting tab 14 on the edge region portion 11-2 such that the reinforcing rib is mounted on the base plate 10 by means of the plug connections. If the placement surface 100 of the base plate 10 is loaded with objects, the reinforcing rib 3 reinforces the base plate 10 and reduces its bending under the weight of the objects.

Figure 6:
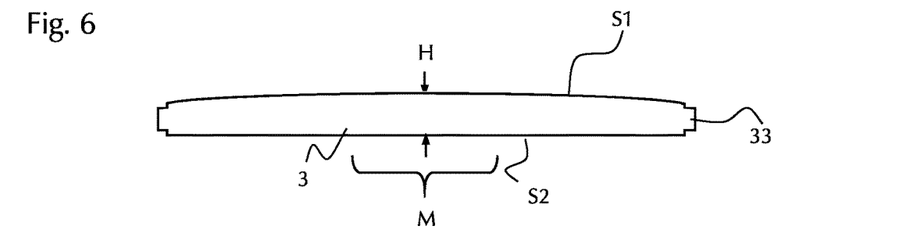
FIG. 6 shows a further example of a reinforcing rib in side view.

If the objects with which the base plate 10 is to be loaded are particularly heavy, the use of a reinforcing rib 3 as shown in FIG. 6 is recommended. This reinforcing rib is similar in its main structure to that of FIGS. 2, 3 (*a*) and 5 and also has a U-shaped profile. While the side S2 of the reinforcing rib facing away from the base plate extends flatly, a height profile is formed in the side S1 facing the base plate 10. The height H (the distance between the sides S1 and S2) increases continuously from the ends of the reinforcing rib 3 supporting the projections 33 toward a central region M and is greatest in the center of the reinforcing rib 3. The height profile can be produced particularly easily if the side S1 is the one on which the free ends of the legs 31 of the U-shaped profile are located. In this case, the height profile can be incorporated when the main shape is cut free from a metal sheet. If the reinforcing rib 3 is fastened to the shelf in the manner described, the height profile on the side S1 causes the base plate 10 to arch slightly, the placement surface 100 in the central region (the most easily deformable region of the base plate) being curved upward the furthest. If objects are placed on the placement surface, the base plate 10 bends back again under the weight of the objects. The height profile of the reinforcing rib is expediently predetermined, taking into account the weight of the objects, such that the base plate is then substantially flat again after the intended loading with the objects.

Figure 7:
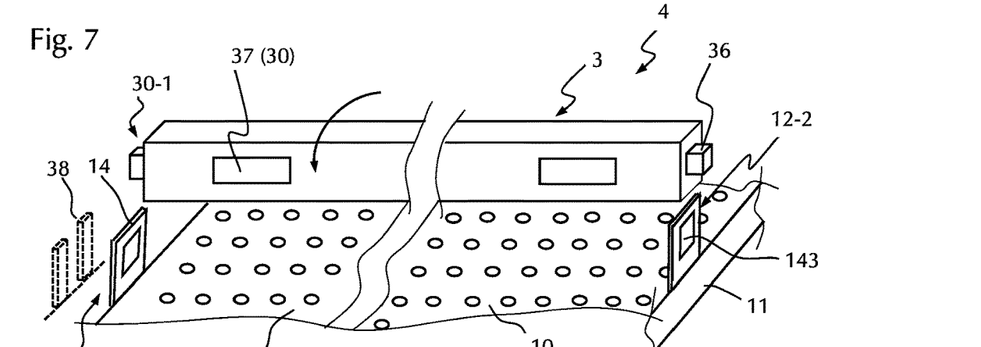
FIG. 7 shows an embodiment of a set according to the present invention comprising a shelf and reinforcing rib in partial perspective view.

FIG. 7 shows a further option for designing the fastening means 12-1, 12-2 and 30-1, 30-2 for detachably fastening a reinforcing rib 3 to the shelf 1. The reinforcing rib 3 is this time designed in the form of a square tube, at the ends of which cuboid projections 36 are arranged as fastening means 30-1 and 30-2. In addition, two permanent magnets 37 are attached as further fastening means 30 to one side of the square tube. In opposite edge regions 11 of the base plate 10, mounting tabs 14 are arranged so as to project beyond the bottom 101. A rectangular opening 143, which can receive one of the cuboid projections of the reinforcing rib 3, is provided in each of the mounting tabs 14. When inserting and removing the reinforcing rib, the mounting tabs 14 can spring open outwardly, as already described above. The reinforcing rib is rotated such that the permanent magnets 37 face toward the base plate 10 when mounted. If said base plate is made of a suitable metal such as steel, a magnetic mount is formed between the base plate and the reinforcing rib. In principle, attaching the reinforcing rib to the base plate 10 exclusively magnetically is conceivable, albeit less preferred. The mounting tabs 14 could therefore also be completely omitted. Another option is to use lateral struts 38 instead of the mounting tabs, between which struts the cuboid projections 36 can be pushed in order to laterally limit the projections and to position the reinforcing rib (shown in dashed lines next to the left tab).

Figure 8:
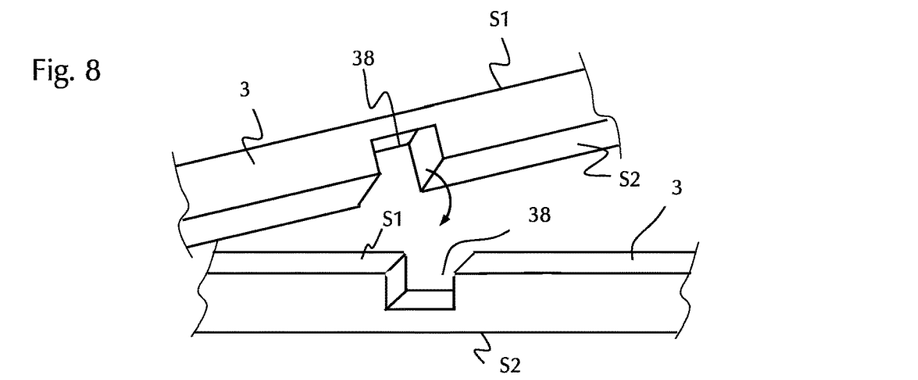
FIG. 8 shows two reinforcing ribs, which can be arranged so as to intersect, in partial view.

FIG. 8 illustrates one option for how a plurality of reinforcing ribs can be used not only in parallel with one another but also in an intersecting manner to stabilize the base plate. For this purpose, the reinforcing ribs have a notch or groove 38 on one of their sides. In the example shown, the grooves 38 are designed in the shape of a cuboid such that the reinforcing ribs in the region of the grooves can be plugged so as to intersect one another. The surfaces S1 and S2 of both reinforcing ribs are flush when plugged together. A plurality of grooves can also be made at suitable intervals over the length of a reinforcing rib if a plurality of reinforcing ribs are intended to intersect one another. In this way, a grid of reinforcing ribs is obtained that ensures particularly good stabilization of the base plate and is particularly suitable for very large base plates. The reinforcing ribs are fastened to the shelf in the manner described above, and combinations of different fastening means can also be used in this and in all other cases.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. A climate cabinet, comprising:
   at least one shelf, the at least one shelf comprising:
      a base plate having a placement surface for objects to be treated in a climate chamber and an underside opposite the placement surface, wherein the at least one shelf is configured to be mounted in the climate chamber of the climate cabinet; and
      at least one reinforcing rib which is configured to be detachably fastened to the base plate,
   wherein the at least one reinforcing rib has a height profile in a direction of longitudinal extension of the at least one reinforcing rib on a side of the at least one reinforcing rib facing the base plate, and wherein the height is greatest in a central region and decreases continuously toward the sides.

2. The climate cabinet according to claim 1,
   wherein the at least one reinforcing rib extends between opposite edge region portions of the at least one shelf located at opposite lateral edges of the base plate.

3. The climate cabinet according to claim 1,
   wherein the at least one reinforcing rib is clamped, latched, plugged and/or magnetically fastened to the base plate.

4. The climate cabinet according to claim 3,
   wherein complementary fastening means are provided in or on opposite edge region portions of the at least one shelf located at opposite lateral edges of the base plate and in a region of the opposite ends of the at least one reinforcing rib.

5. The climate cabinet according to claim 1,
   wherein a plurality reinforcing ribs are mutually spaced and are fastened to the base plate so as to extend substantially in parallel with one another.

6. The climate cabinet according to claim 1,
   wherein the at least one shelf has a larger number of fastening options for a plurality of reinforcing ribs than a number of the plurality of reinforcing ribs which are detachably fastened to the base plate.

7. The climate cabinet according to claim 1,
   wherein the at least one reinforcing rib has at least one of the following features:
   the at least one reinforcing rib is fastened to the underside of the base plate,
   the at least one reinforcing rib abuts the base plate over substantially its entire length,
   the at least one reinforcing rib is designed to be substantially rod-shaped,
   the at least one reinforcing rib is designed as an L-profile or U-shaped profile, of which the free ends of the at least one reinforcing rib face toward the base plate, and/or
   the at least one reinforcing rib consists of a metal.

8. The climate cabinet according to claim 1,
   wherein a side of the at least one reinforcing rib opposite the side having the height profile is flat and the at least one reinforcing rib is provided with fastening means such that said at least one reinforcing rib can be fastened to the base plate both with the flat side and with the side toward the base plate provided with a height profile.

9. The climate cabinet according to claim 1,
   wherein the at least one shelf has at least one of the following properties:
   the at least one shelf has a number of through-openings in the base plate, and/or
   the at least one shelf is made of a metal.

* * * * *

UNITED STATES PATENT AND TRADEMARK OFFICE
CERTIFICATE OF CORRECTION

PATENT NO. : 11,617,439 B2
APPLICATION NO. : 17/142331
DATED : April 4, 2023
INVENTOR(S) : Holger Aulbach It is certified that error appears in the above-identified patent and that said Letters Patent is hereby corrected as shown below:

On the Title Page

Other Publications, Line 1, change "English trasnlation for DE4227828 (Year: 1993)*" to --English translation for DE4227828 (Year: 1993)*--.

In the Claims

In Claim 5, Column 12, Line 5, change "wherein a plurality reinforcing ribs are mutually spaced" to --wherein a plurality of reinforcing ribs are mutually spaced--.

Signed and Sealed this
Thirteenth Day of June, 2023

*Katherine Kelly Vidal*

Katherine Kelly Vidal
*Director of the United States Patent and Trademark Office*